(12) United States Patent
Bales

(10) Patent No.: US 10,488,048 B2
(45) Date of Patent: Nov. 26, 2019

(54) WELD CONFIGURATION

(71) Applicant: UNITED TECHNOLOGIES CORPORATION, Farmington, CT (US)

(72) Inventor: Daniel A. Bales, Avon, CT (US)

(73) Assignee: United Technologies Corporation, Farmington, CT (US)

(*) Notice: Subject to any disclaimer, the term of this patent is extended or adjusted under 35 U.S.C. 154(b) by 305 days.

(21) Appl. No.: 15/398,852

(22) Filed: Jan. 5, 2017

(65) Prior Publication Data

US 2017/0191666 A1 Jul. 6, 2017

Related U.S. Application Data

(60) Provisional application No. 62/275,508, filed on Jan. 6, 2016.

(51) Int. Cl.
F02C 7/22 (2006.01)
F23R 3/28 (2006.01)
B23K 31/02 (2006.01)
B23K 101/00 (2006.01)
B65D 6/32 (2006.01)

(52) U.S. Cl.
CPC ............... *F23R 3/28* (2013.01); *B23K 31/02* (2013.01); *F02C 7/22* (2013.01); *B23K 2101/001* (2018.08); *B65D 7/38* (2013.01); *F05D 2230/232* (2013.01)

(58) Field of Classification Search
CPC ............... F02C 7/232; F02C 7/22; B65D 7/38
See application file for complete search history.

(56) References Cited

U.S. PATENT DOCUMENTS

| | | | |
|---|---|---|---|
| 4,000,952 A * | 1/1977 | Bryan | B23K 33/004 251/315.01 |
| 5,042,300 A | 8/1991 | Benjey et al. | |
| 5,165,305 A * | 11/1992 | Veronesi | F04D 13/02 219/117.1 |
| 5,262,604 A | 11/1993 | Powell | |
| 6,195,013 B1 | 2/2001 | Robinson | |
| 6,513,378 B1 | 2/2003 | Love, Jr. | |
| 6,602,103 B1 | 8/2003 | Good | |
| 6,727,822 B2 | 4/2004 | Chamberlin et al. | |
| 9,127,631 B2 * | 9/2015 | Petrone | F02M 59/06 |
| 10,077,714 B2 * | 9/2018 | Siders | F23R 3/14 |
| 2008/0057271 A1 * | 3/2008 | Bunker | F01D 5/186 428/137 |
| 2009/0129939 A1 | 5/2009 | Hampton | |

* cited by examiner

*Primary Examiner* — Gerald L Sung
*Assistant Examiner* — Rene D Ford
(74) *Attorney, Agent, or Firm* — Carlson, Gaskey & Olds, P.C.

(57) ABSTRACT

A float assembly according to an example of the present disclosure includes a guide extending in a first direction that has a stand-up and a shelf. A cover is oriented in a second direction substantially perpendicular to the first direction and welded to the stand-up at a weld joint. An undersurface of the cover abuts the shelf, and the abutment begins at a first distance in the second direction from the weld joint and ends at a second distance in the second direction from the weld joint.

17 Claims, 5 Drawing Sheets

WELD CONFIGURATION

CROSS-REFERENCE TO RELATED APPLICATIONS

This application claims priority to U.S. Provisional Application No. 62/275,508 which was filed on Jan. 6, 2016 and is incorporated herein by reference.

BACKGROUND

A gas turbine engine typically includes a fan section, a compressor section, a combustor section, and a turbine section. Air entering the compressor section is compressed and delivered into the combustor section where it is mixed with fuel and ignited to generate a high-speed exhaust gas flow. The high-speed exhaust gas flow expands through the turbine section to drive the compressor and the fan section. The compressor section typically includes low and high pressure compressors, and the turbine section includes low and high pressure turbines. The components may have associated fluid containers. As one example, a combustor may include an associated fuel container.

This disclosure relates to weld configurations. In some examples, weld configurations may be used in gas turbine engines, one example being a float guide for a fuel container.

SUMMARY

A float assembly according to an example of the present disclosure includes a guide extending in a first direction that has a stand-up and a shelf. A cover is oriented in a second direction substantially perpendicular to the first direction and welded to the stand-up at a weld joint. An undersurface of the cover abuts the shelf, and the abutment begins at a first distance in the second direction from the weld joint and ends at a second distance in the second direction from the weld joint.

In a further embodiment of any of the foregoing embodiments, the weld joint extends in the first direction.

In a further embodiment of any of the foregoing embodiments, the guide and the cover form a cavity directly adjacent the weld joint.

In a further embodiment of any of the foregoing embodiments, the cavity is provided by the undersurface, the stand-up, and the shelf.

In a further embodiment of any of the foregoing embodiments, the cavity extends at least the first distance in the second direction.

In a further embodiment of any of the foregoing embodiments, the cavity is directly adjacent the abutment.

In a further embodiment of any of the foregoing embodiments, the weld joint extends from the cavity to a surface of the cover opposite the under surface.

A gas turbine engine according to an example of the present disclosure includes a combustor and a fuel container in communication with the combustor. The fuel container has a float assembly. The float assembly includes a guide extending in a first direction and having a stand-up and a shelf, and a cover oriented in a second direction substantially perpendicular to the first direction and welded to the stand-up at a weld joint. An undersurface of the cover abuts the shelf, and the abutment begins at a first distance in the second direction from the weld joint and ends at a second distance in the second direction from the weld joint.

In a further embodiment of any of the foregoing embodiments, the weld joint extends in the first direction.

In a further embodiment of any of the foregoing embodiments, the guide and the cover form a cavity directly adjacent the weld joint.

In a further embodiment of any of the foregoing embodiments, the cavity is provided by the undersurface, the stand-up, and the shelf.

In a further embodiment of any of the foregoing embodiments, the cavity extends at least the first distance in the second direction.

In a further embodiment of any of the foregoing embodiments, the cavity is directly adjacent the abutment.

In a further embodiment of any of the foregoing embodiments, the weld joint extends from the cavity to a surface of the cover opposite the under surface.

A method for assembling a float assembly according to an example of the present disclosure includes welding a cover to a guide at a weld joint. The guide extends in a first direction and includes a stand-up and a shelf, and the cover is oriented in a second direction substantially perpendicular to the first direction. An undersurface of the cover abuts the shelf, and the abutment begins at a first distance in the second direction from the weld joint and ends at a second distance in the second direction from the weld joint.

In a further embodiment of any of the foregoing embodiments, the weld joint extends in the first direction.

These and other features may be best understood from the following drawings and specification.

DETAILED DESCRIPTION

Figure 1:
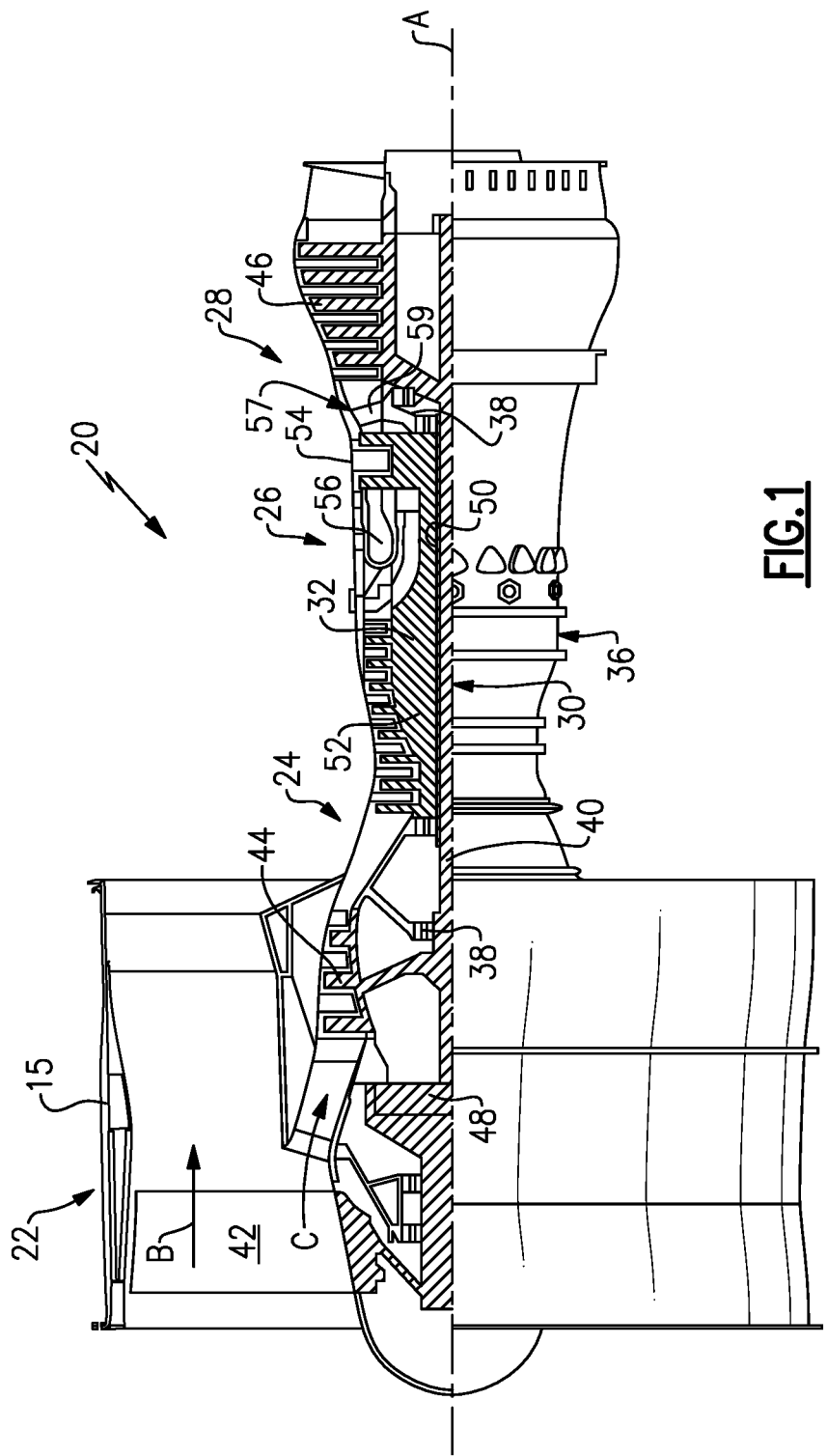
FIG. 1 schematically shows an embodiment of a gas turbine engine.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. Alternative engines might include an augmentor section (not shown) among other systems or features. The fan section 22 drives air along a bypass flow path B in a bypass duct defined within a nacelle 15, while the compressor section 24 drives air along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

The exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects a fan 42, a first (or low) pressure compressor 44 and a first (or low) pressure turbine 46. The inner shaft 40 is connected to the fan 42 through a speed change mechanism, which in exemplary gas turbine engine 20 is illustrated as a geared architecture 48 to drive the fan 42 at a lower speed than the low speed spool 30. The high speed spool 32 includes an outer shaft 50 that interconnects a second (or high) pressure compressor 52 and a second (or high) pressure turbine 54. A combustor 56 is arranged in exemplary gas turbine 20 between the high pressure compressor 52 and the high pressure turbine 54. A mid-turbine frame 57 of the engine static structure 36 is arranged generally between the high pressure turbine 54 and the low pressure turbine 46. The mid-turbine frame 57 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 then the high pressure compressor 52, mixed and burned with fuel in the combustor 56, then expanded over the high pressure turbine 54 and low pressure turbine 46. The mid-turbine frame 57 includes airfoils 59 which are in the core airflow path C. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of combustor section 26 or even aft of turbine section 28, and fan section 22 may be positioned forward or aft of the location of gear system 48.

The engine 20 in one example is a high-bypass geared aircraft engine. In a further example, the engine 20 bypass ratio is greater than about six (6), with an example embodiment being greater than about ten (10), the geared architecture 48 is an epicyclic gear train, such as a planetary gear system or other gear system, with a gear reduction ratio of greater than about 2.3 and the low pressure turbine 46 has a pressure ratio that is greater than about five. In one disclosed embodiment, the engine 20 bypass ratio is greater than about ten (10:1), the fan diameter is significantly larger than that of the low pressure compressor 44, and the low pressure turbine 46 has a pressure ratio that is greater than about five 5:1. Low pressure turbine 46 pressure ratio is pressure measured prior to inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.3:1. It should be understood, however, that the above parameters are only exemplary of one embodiment of a geared architecture engine and that the present invention is applicable to other gas turbine engines including direct drive turbofans.

A significant amount of thrust is provided by the bypass flow B due to the high bypass ratio. The fan section 22 of the engine 20 is designed for a particular flight condition—typically cruise at about 0.8 Mach and about 35,000 feet (10,668 meters). The flight condition of 0.8 Mach and 35,000 ft (10,668 meters), with the engine at its best fuel consumption—also known as "bucket cruise Thrust Specific Fuel Consumption ('TSFC')"—is the industry standard parameter of lbm of fuel being burned divided by lbf of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of $[(Tram\ °\ R)/(518.7°\ R)]^{0.5}$. The "Low corrected fan tip speed" as disclosed herein according to one non-limiting embodiment is less than about 1150 ft/second (350.5 meters/second).

Figure 2:
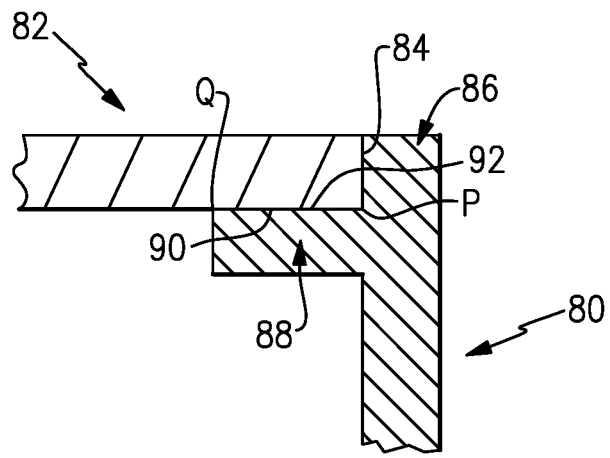
FIG. 2 shows a prior art weld configuration.

FIG. 2 illustrates a prior art weld configuration including a member 80 extending in a first direction supporting a member 82 extending in a second direction substantially perpendicular to the first direction. The member 82 and the member 80 are welded together at the weld joint 84 extending in the first direction. The upper end of the member 80 includes a stand-up 86 extending in the first direction and a shelf 88 extending in the second direction. The undersurface 90 of the member 82 interfaces with the upper surface 92 of the shelf 88 of the member 80 from point P at the weld joint 84 to point Q. While adequate for many applications, it may be desired in some weld configurations to have reduced stress concentration on the weld's root or backside.

Figure 3:
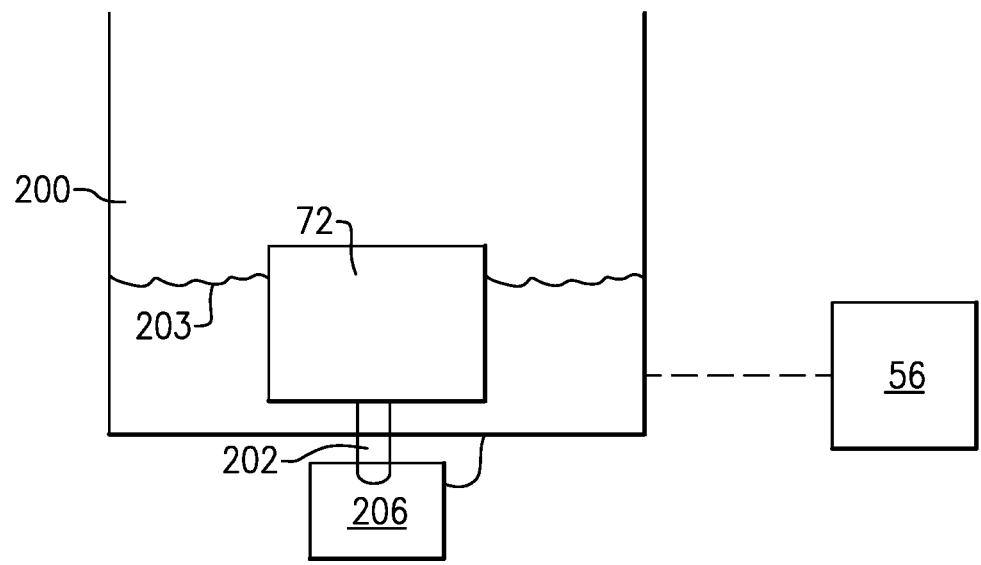
FIG. 3 schematically shows an example float assembly in a fluid container.

As illustrated schematically in FIG. 3, the combustor 56 is in communication with a fluid container 200. The fluid container 200 includes a body of fluid 203, one example fluid 203 being fuel, and a float 72 within the body of fluid 203. The float 72 is coupled to poppet valve 202 for activating a valve or switch 206 that controls fluid flow in and/or out of the container 200.

Figure 4:
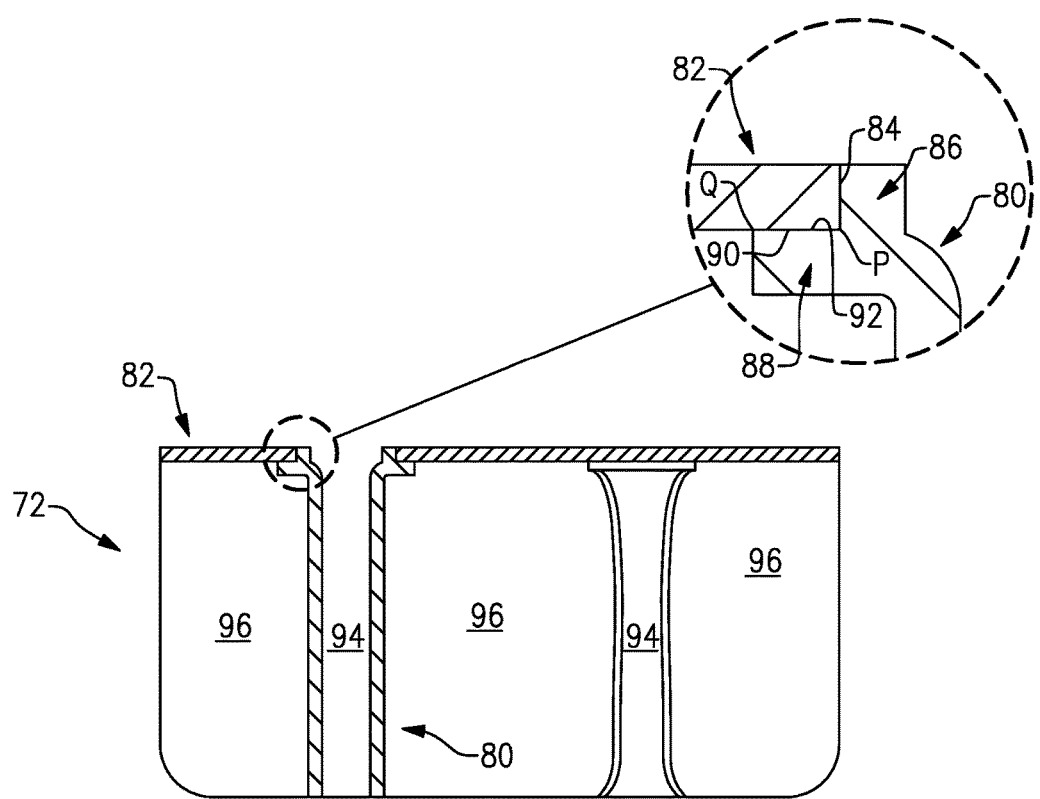
FIG. 4 is a cross sectional view of a prior art float assembly weld configuration.

FIG. 4 illustrates, as one example of the prior art weld configuration in FIG. 2, a prior art float 72 in cross section. The float 72 has one or more guides 80 extending in a first direction and supporting a cover 82 oriented in a second direction substantially perpendicular to the first direction. The cover 82 and the guide 80 are welded together at the weld joint 84 extending in the first direction. The upper end of the guide 80 includes a stand-up 86 extending in the first direction and a shelf 88 extending in the second direction. The undersurface 90 of the cover 82 interfaces with the upper surface 92 of the shelf 88 of the guide 80 from point P at the weld joint 84 to point Q.

The guides 80 provide openings 94 in the float 72 for receiving the fluid 203 (see FIG. 3) and fluidly isolate the openings 94 from cavities 96. The cavities 96 may be filled with air or may be a vacuum, for example, allowing the float 72 to float in the fluid 203.

Figure 5:
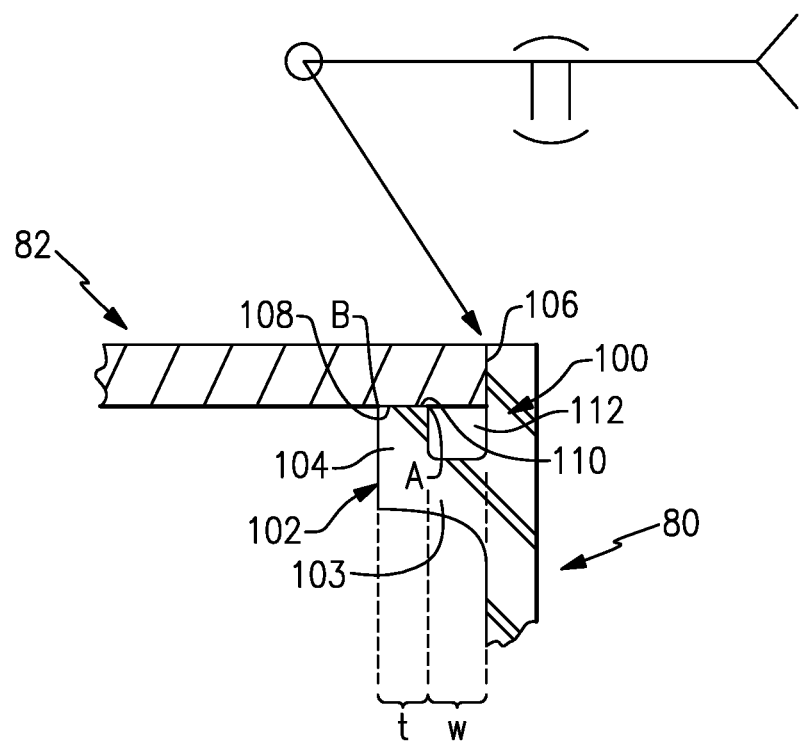
FIG. 5 shows an example weld configuration.

FIG. 5 illustrates an example configuration for a guide 80 extending in a first direction and cover 82 oriented in a second direction substantially perpendicular to the first direction. The guide 80 includes, at its upper end, a stand-up 100 extending in the first direction. The guide further includes a shelf 102 having a portion 103 extending in the second direction and a portion 104 extending in the first direction from the portion 103.

The cover 82 is welded to the stand-up 100 of guide 80 at a weld joint 106 extending in the first direction. The undersurface 108 of the cover 82 abuts the upper surface 110 of the portion 104 of the guide 80. The abutment begins at point A and ends at point B, and points A and B are both spaced in the second direction from the weld joint 106. The abutment of the undersurface 108 and the upper surface 110 is spaced in the second direction from the weld joint 106, such that a cavity 112 is formed underneath the undersurface 108 and between the stand-up 100 and the portion 104 of the shelf 102. The example configuration of FIG. 5 results in a reduced stress concentration on the weld's backside.

As shown, the width w of the cavity 112 on the second direction is substantially the same as the thickness t of the guide 80. As one example, the width w is 1-1.5 times the thickness t. The cavity 112 may capture weld spatter.

Figure 6:
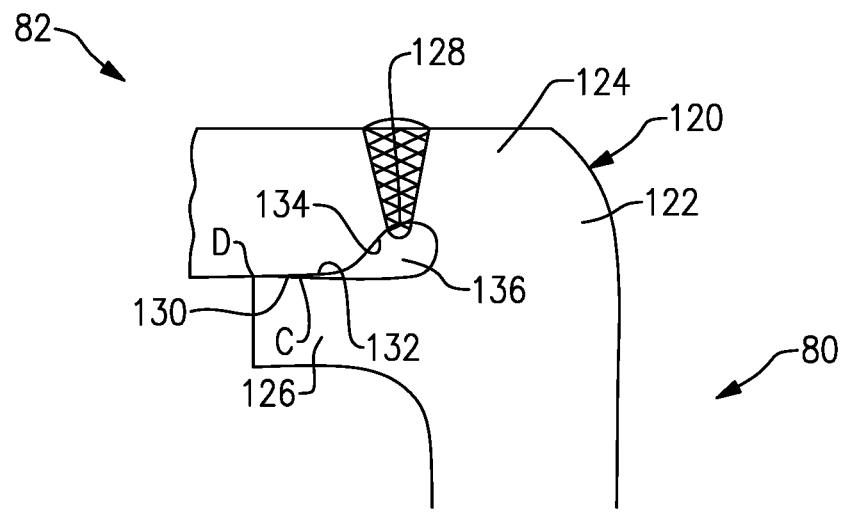
FIG. 6 shows another example weld configuration.

FIG. 6 illustrates a second example configuration of a guide 80 extending in a first direction and a cover 82 oriented in a second direction substantially perpendicular to the first direction. The upper end of the guide 80 includes a stand-up 120 having a section 122 extending in the first direction and a section 124 extending in the second direction from the section 122. The guide further includes a shelf 126 extending in the second direction.

The cover 82 is welded to the section 124 of the stand-up 120 of the guide 80 at a weld joint 128 extending in the first direction. The undersurface 130 of the cover 82 abuts the upper surface 132 of the shelf 126 of the guide 80, and the abutment is spaced in the second direction and in the first direction from the weld joint 128. The abutment begins at point C and ends at point D, and points C and D are both spaced in the second direction from the weld joint 128. The undersurface 130 of the cover 82 has a tapered portion 134 that tapers as it approaches the weld joint 128. The section 124 and the section 122 of the stand-up 120, the tapered portion 134, and the upper surface 132 form a cavity 136 below the weld joint 128. A portion of the weld of weld joint 128 may extend into the cavity 136. The example configuration of FIG. 6 results in a reduced stress concentration on the weld's backside.

Figure 7:
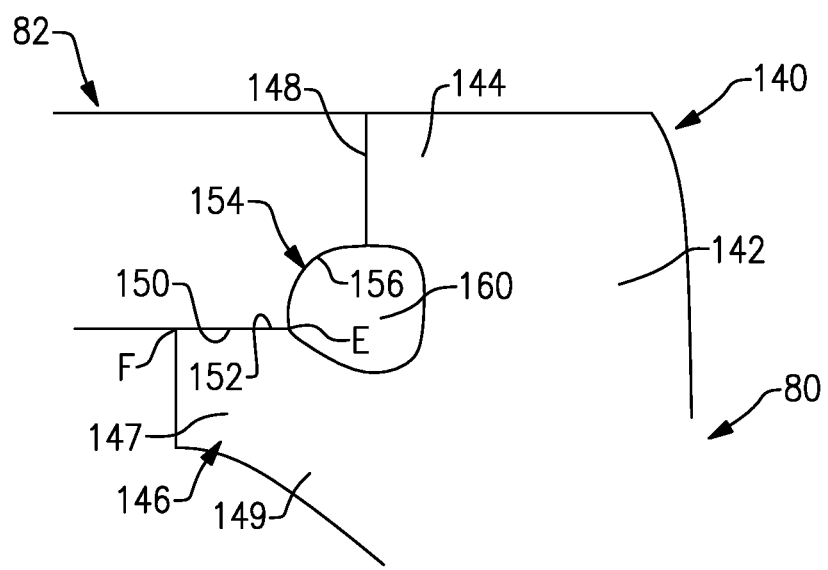
FIG. 7 shows another example weld configuration.

FIG. 7 illustrates a third example configuration of a guide 80 extending in a first direction and a cover 82 oriented in a second direction substantially perpendicular to the first direction. The upper end of the guide 80 includes a stand-up 140 having a portion 142 extending in the first direction and a portion 144 extending in the second direction from the portion 142. The upper end of the guide 80 further includes a shelf 146 having a portion 147 extending in the second direction and a portion 149 extending diagonally in both the first and second directions.

The cover 82 is welded to the portion 144 of the stand-up 140 of guide 80 at a weld joint 148 extending in the first direction. An undersurface 150 of the cover 82 abuts an upper surface 152 of the shelf 146. The abutment begins at point E and ends at point F, and both points E and F are spaced in the second direction from the weld joint 148. The undersurface 150 tapers 154 as it approaches the weld joint 148 to form a concave surface 156. The concave surface 156, the portion 144 of the guide 80, the portion 142 of the guide 80, and the portion 149 of the shelf 146 form a cavity 160 underneath the weld joint 148. The example configuration of FIG. 7 results in a reduced stress concentration on the weld's backside.

As one example, the example weld configurations described herein are provided by electron beam welding. Of course, other types of welding are contemplated.

Although the examples disclosed are weld configurations for a float assembly, one of ordinary skill in the art having the benefit of this disclosure would recognize that that the disclosed weld configurations are not limited to such applications.

It should be understood that relative positional terms such as "forward," "aft," "upper," "lower," "above," "below," "upper surface," "undersurface," and the like are with reference to the orientation shown in the figures and should not be considered otherwise limiting. Terms such as "generally," "substantially," and "about" are not intended to be boundaryless terms, and should be interpreted consistently with the way one skilled in the art would interpret those terms.

The foregoing description is exemplary rather than defined by the limitations within. Many modifications and variations of the present invention are possible in light of the above teachings. The disclosed embodiments of this invention have been disclosed, however, one of ordinary skill in the art would recognize that certain modifications would come within the scope of this invention. It is, therefore, to be understood that within the scope of the appended claims, the invention may be practiced otherwise than as specifically described. For that reason the following claims should be studied to determine the true scope and content of this invention.

What is claimed is:

1. A float assembly comprising:
   a guide extending in a first direction and having a stand-up and a shelf; and
   a cover oriented in a second direction substantially perpendicular to the first direction and welded to the stand-up at a weld joint, wherein an undersurface of the cover abuts the shelf at an abutment, and the abutment begins at a first distance in the second direction from the weld joint and ends at a second distance in the second direction from the weld joint, wherein the guide and the cover from a cavity directly adjacent the weld joint, and the cover tapers as the cover extends toward the weld joint, such that the undersurface includes a concave surface that partially bounds the cavity.

2. The float assembly as recited in claim 1, wherein the weld joint extends in the first direction.

3. The float assembly as recited in claim 1, wherein the cavity is bound by the undersurface, the stand-up, and the shelf.

4. The float assembly as recited in claim 3, wherein the cavity extends at least the first distance in the second direction.

5. The float assembly as recited in claim 1, wherein the cavity is directly adjacent the abutment.

6. The float assembly as recited in claim 1, wherein the weld joint extends from the cavity to a surface of the cover opposite the undersurface.

7. The float assembly as recited in claim 1, wherein the guide and the cover provide at least one interior cavity, the guide provides an opening in the float assembly, and the guide fluidly isolates the opening from the interior cavity.

8. A gas turbine engine, comprising:
   a combustor;
   a fuel container in communication with the combustor, the fuel container including a float assembly within a body of fuel in the fuel container, wherein the float assembly comprises:
   a guide extending in a first direction and having a stand-up and a shelf; and
   a cover oriented in a second direction substantially perpendicular to the first direction and welded to the stand-up at a weld joint, wherein an undersurface of the cover abuts the shelf at an abutment, and the abutment begins at a first distance in the second direction from the weld joint and ends at a second distance in the second direction from the weld joint, wherein the guide and the cover from a cavity directly adjacent the weld joint, and the cover tapers as the cover extends toward the weld joint, such that the undersurface includes a concave surface that partially bounds the cavity.

9. The gas turbine engine as recited in claim 8, wherein the weld joint extends in the first direction.

10. The gas turbine engine as recited in claim 8, wherein the cavity is bound by the undersurface, the stand-up, and the shelf.

11. The gas turbine engine as recited in claim 10, wherein the cavity extends at least the first distance in the second direction.

12. The gas turbine engine as recited in claim 8, wherein the cavity is directly adjacent the abutment.

13. The float assembly as recited in claim 8, wherein the weld joint extends from the cavity to a surface of the cover opposite the undersurface.

14. The gas turbine engine as recited in claim 8, wherein the float assembly is coupled to a poppet valve for activating a switch that controls fluid flow into or out of the fuel container.

15. A float assembly, comprising:
a guide having a stand-up and a shelf, wherein the stand-up includes a first stand-up portion extending in a first direction and a second stand-up portion extending in a second direction from the first portion, the first direction substantially perpendicular to the first direction, and the shelf includes a first shelf portion extending in a direction angled in the first and second directions and a second shelf portion extending in the second direction from the first shelf portion; and
a cover oriented in the second direction and welded to the second stand-up portion at a weld joint, wherein an undersurface of the cover abuts the shelf at an abutment, and the abutment begins at a first distance in the second direction from the weld joint and ends at a second distance in the second direction from the weld joint
wherein the guide and the cover form a cavity directly adjacent the weld joint, and the cover tapers as the cover extends toward the weld joint, such that the undersurface includes a concave surface that partially bounds the cavity.

16. The float assembly as recited in claim 15, wherein the first stand-up portion, the second stand-up portion, the first shelf portion, and the concave surface bound the cavity.

17. The float assembly as recited in claim 15, wherein the guide and the cover provide at least one interior cavity different from the cavity, the guide provides an opening in the float assembly, and the guide fluidly isolates the opening from the interior cavity.

* * * * *